United States Patent
Park et al.

(10) Patent No.: US 12,451,533 B2
(45) Date of Patent: Oct. 21, 2025

(54) METHOD FOR REDUCING WASTE BY RECOVERING TRANSITION METALS FROM LITHIUM SECONDARY BATTERY

(71) Applicant: SK INNOVATION CO., LTD., Seoul (KR)

(72) Inventors: Ji Yun Park, Daejeon (KR); Hyeon Hui Lee, Daejeon (KR); Keum Jung Yoon, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 18/334,801

(22) Filed: Jun. 14, 2023

(65) Prior Publication Data
US 2024/0030510 A1     Jan. 25, 2024

Related U.S. Application Data

(63) Continuation of application No. PCT/KR2021/019931, filed on Dec. 27, 2021.

(30) Foreign Application Priority Data

Jan. 15, 2021 (KR) .................. 10-2021-0006160

(51) Int. Cl.
*H01M 10/54* (2006.01)
*C22B 3/00* (2006.01)
(Continued)

(52) U.S. Cl.
CPC ............. *H01M 10/54* (2013.01); *C22B 7/007* (2013.01); *C22B 23/0415* (2013.01); *C22B 47/0063* (2013.01)

(58) Field of Classification Search
CPC .......... H01M 10/54; C22B 7/006–007; C22B 23/04–0438; C22B 47/0045–0063
(Continued)

(56) References Cited

U.S. PATENT DOCUMENTS

2013/0192425 A1    8/2013 Sonu et al.

FOREIGN PATENT DOCUMENTS

CN       107196004 A  *   9/2017
JP        2013-1950 A     1/2013
(Continued)

OTHER PUBLICATIONS

Espacenet machine translation of KR20200046295A (Year: 2020).*
(Continued)

*Primary Examiner* — Jonathan G Leong
*Assistant Examiner* — Katharine A Caughron
(74) *Attorney, Agent, or Firm* — IP & T GROUP LLP

(57) ABSTRACT

A method for reducing waste by recovering transition metal of a lithium secondary battery of the present invention includes preparing a cathode active material from a cathode of the lithium secondary battery, producing a first leachate by treating the cathode active material with a first acidic solution containing a reducing agent in an amount smaller than an amount corresponding to a reaction equivalent of the cathode active material, and producing a second leachate by treating the remaining cathode active material, which excludes a fraction contained in the first leachate, with a second acidic solution containing a reducing agent. Accordingly, extraction rate of manganese and purity of cobalt may be improved.

10 Claims, 2 Drawing Sheets

(51) Int. Cl.
*C22B 7/00* (2006.01)
*C22B 47/00* (2006.01)

(58) Field of Classification Search
USPC .......................................... 429/49
See application file for complete search history.

(56) References Cited

FOREIGN PATENT DOCUMENTS

| | | | |
|---|---|---|---|
| JP | 2013-112859 A | | 6/2013 |
| JP | 2013-194315 A | | 9/2013 |
| JP | 2017-115179 A | | 6/2017 |
| KR | 10-2001-0106562 A | | 12/2001 |
| KR | 10-0820163 B1 | | 4/2008 |
| KR | 20120021256 A | * | 3/2012 |
| KR | 10-2012-0037736 A | | 4/2012 |
| KR | 10-1342246 B1 | | 12/2013 |
| KR | 10-2015-0094412 A | | 8/2015 |
| KR | 10-1883100 B1 | | 7/2018 |
| KR | 10-2020-0046295 A | | 5/2020 |
| KR | 10-2020-0078386 A | | 7/2020 |
| KR | 10-2132120 B1 | | 7/2020 |
| KR | 10-2154599 B1 | | 9/2020 |

OTHER PUBLICATIONS

Machine translation of KR20120021256A (Year: 2012).*
Machine translation of CN-107196004-A (Year: 2017).*
International Search Report for the International Application No. PCT/KR2021/019931 issued by the International Searching Authority on Apr. 1, 2022.
Office Action for Korean Patent Application No. 10-2021-0006160 issued by the Korean Intellectual Property Office (KIPO) on Apr. 17, 2025.
Basudev Swain et al., Extraction/Separation of Cobalt by Solvent Extraction: A Review, Applied Chemistry for Engineering, 2015, pp. 631-639, vol. 26, No. 6.
Extended European Search Report for the European Patent Application No. 21919939.5 issued by the European Patent Office on Aug. 29, 2024.
Office Action for Japanese Patent Application No. 2023-541907 issued by the Japanese Patent Office on Jul. 1, 2025.

* cited by examiner

METHOD FOR REDUCING WASTE BY RECOVERING TRANSITION METALS FROM LITHIUM SECONDARY BATTERY

CROSS-REFERENCE TO RELATED APPLICATION

This application is a Bypass Continuation Application of PCT/KR2021/019931 filed on Dec. 27, 2021, which claims priority to Korean Patent Application No. 10-2021-0006160 filed on Jan. 15, 2021. The entire disclosure of each of the foregoing applications is incorporated herein by reference in its entirety.

TECHNICAL FIELD

The present invention relates to a method for recovering a transition metal of a lithium secondary battery. More specifically, the present invention relates to a method for reducing waste by recovering transition metals from a cathode of a lithium secondary battery.

BACKGROUND ART

A secondary battery is a battery that can be repeatedly charged and discharged, and is widely applied to portable electronic devices such as camcorders, mobile phones, and laptop computers with the development of information communication and display industries. Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

The lithium secondary battery may include an electrode assembly including a cathode, an anode, and a separator, and an electrolyte in which the electrode assembly is impregnated. In addition, the lithium secondary battery may further include, for example, a pouch-shaped outer case in which the electrode assembly and the electrolyte are housed.

A lithium metal oxide may be used as a cathode active material for the lithium secondary battery. The lithium metal oxide may further contain transition metals such as nickel, cobalt, or manganese.

The lithium composite oxide as the cathode active material may be prepared by reacting a lithium precursor with a nickel-cobalt-manganese (NCM) precursor containing nickel, cobalt and manganese.

As the above-described expensive valuable metals are used for the cathode active material, excessively high costs are required to manufacture the cathode material. In addition, as the environmental protection issue is recently emerging, research on a method for recovering a cathode active material is being conducted. In order to recycle the cathode active material, it is necessary to regenerate the lithium precursor from a waste cathode with high efficiency and high purity.

DETAILED DESCRIPTION OF THE INVENTION

Technical Objective

According to an aspect of the present invention, there is provided a method for recovering a transition metal of a lithium secondary battery with high efficiency and high purity.

SUMMARY

A method for recovering a transition metal of a lithium secondary battery according to embodiments of the present invention includes preparing a cathode active material from a cathode of the lithium secondary battery, producing a first leachate by treating the cathode active material with a first acidic solution containing a reducing agent in an amount smaller than an amount corresponding to a reaction equivalent of the cathode active material, and producing a second leachate by treating the remaining cathode active material, which excludes the fraction included in the first leachate, with a second acidic solution containing a reducing agent.

In some embodiments, the cathode active material may include a lithium transition metal oxide containing nickel, cobalt and manganese.

In some embodiments, an amount of the reducing agent used in the step of producing the first leachate may be 0.2 to 0.4 times the amount corresponding to the reaction equivalent of the lithium transition metal oxide.

In some embodiments, the reaction equivalent of the lithium transition metal oxide of the reducing agent may be 0.5 mol based on 1 mol of the lithium transition metal oxide.

In some embodiments, the reducing agent may be hydrogen peroxide ($H_2O_2$).

In some embodiments, an amount of the reducing agent used in the step of producing the second leachate may be 0.8 to 1.2 times the amount corresponding to the reaction equivalent of the remaining cathode active material.

In some embodiments, contents of cobalt and nickel contained in the first leachate may be 75 to 100% by weight of a total weight of the transition metals, respectively, and a content of manganese contained in the second leachate may be 30 to 75% by weight of the total weight of the transition metal.

In some embodiments, the method may further include sequentially extracting cobalt and nickel from the first leachate.

In some embodiments, the method may further include sequentially extracting manganese, cobalt and nickel from the second leachate.

In some embodiments, a weight ratio of the remaining cathode active material based on a weight of the cathode active material may be 25 to 50% by weight.

In some embodiments, the first acidic solution and the second acidic solution may include sulfuric acid ($H_2SO_4$).

Effects of the Invention

In the method for recovering transition metals from a lithium secondary battery according to the above-described embodiments, a first leachate which is a cobalt and nickel rich solution, may be prepared by inputting a relatively small amount of the reducing agent, and a second leachate, which is a manganese rich solution, may be prepared by inputting a relatively large amount of the reducing agent into the residual cathode active material remaining after the separation of the first leachate. In this case, cobalt may be recovered with high purity by directly inputting the first leachate in cobalt and nickel extraction processes, and a high extraction rate of manganese may be implemented by inputting the second leachate in a manganese extraction process. Thereby, the recovery efficiency of transition metals in the lithium secondary battery may be increased.

In some embodiments, a ratio of the weight of the remaining cathode active material to the weight of the cathode active material may decrease. Accordingly, an amount of the second leachate, which is a raw material in the manganese extraction process, is relatively reduced, such that the extraction rate and extraction efficiency of manganese may be increased.

EMBODIMENTS FOR PRACTICING THE INVENTION

Embodiments of the present invention provide a method for recovering transition metals from a lithium secondary battery including two processes of leaching the transition metals.

Hereinafter, embodiments of the present invention will be described in detail with reference to the accompanying drawings. However, these embodiments are merely an example, and the present invention is not limited to the specific embodiments described as the example.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
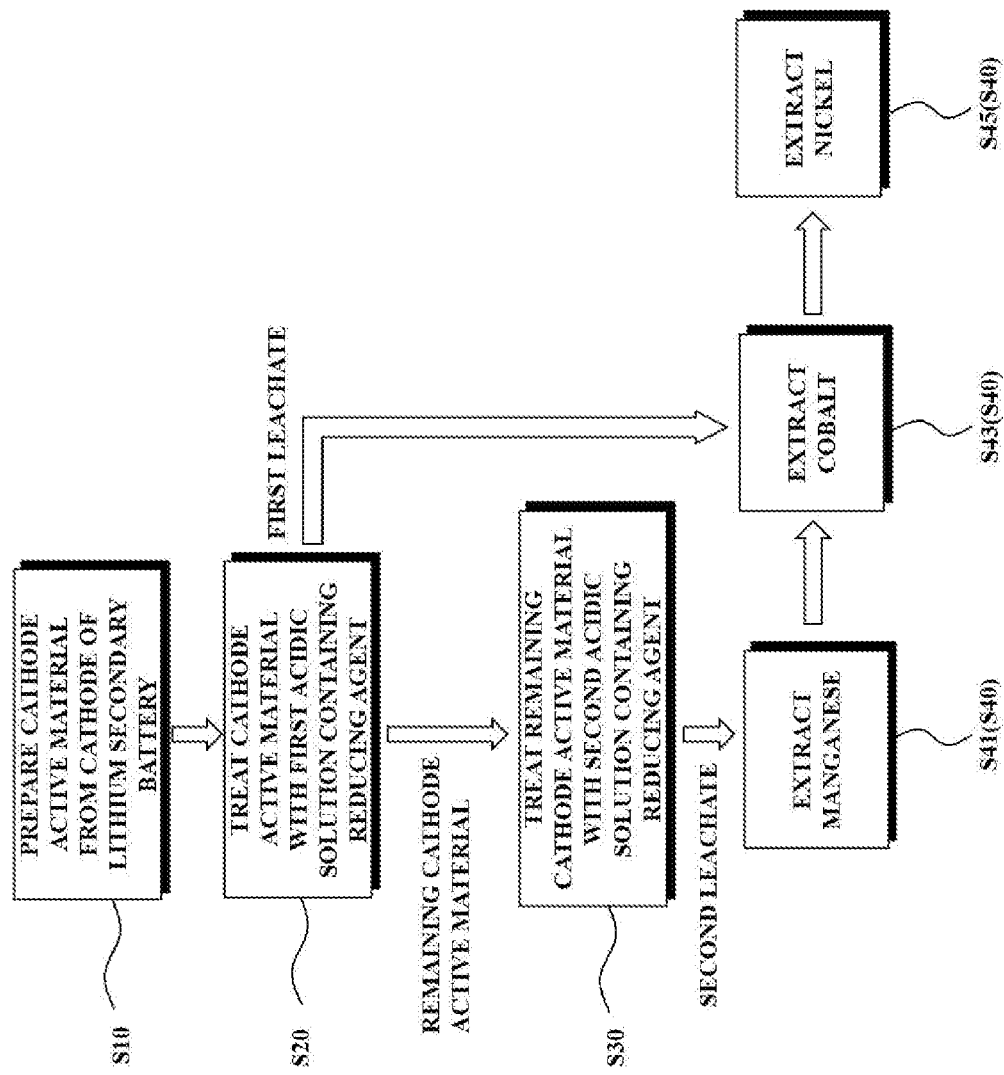
FIG. 1 is a schematic flowchart for describing a method for recovering transition metals from a lithium secondary battery according to embodiments.

FIG. 1 is a schematic flowchart for describing a method for recovering transition metals from a lithium secondary battery according to embodiments.

Referring to FIG. 1, a cathode active material may be prepared from a cathode of a lithium secondary battery (e.g., process S10).

Preparing the Cathode Active Material

The lithium secondary battery may include an electrode assembly including a cathode, an anode, and a separation membrane interposed between the cathode and the anode. The cathode and anode may include a cathode active material layer and an anode active material layer, which are coated on a cathode current collector and an anode current collector, respectively.

For example, the cathode active material included in the cathode active material layer may include an oxide containing lithium and transition metals.

In some embodiments, the cathode active material may include a compound having a composition represented by Formula 1 below.

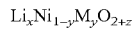

Formula 1

In Formula 1, $0.9 \leq x \leq 1.2$, $0 \leq y \leq 0.7$, and $-0.1 \leq z \leq 0.1$, and M may be at least one element selected from the group consisting of Na, Mg, Ca, Y, Ti, Hf, V, Nb, Ta, Cr, Mo, W, Mn, Co, Fe, Cu, Ag, Zn, B, Al, Ga, C, Si and Sn, or Zr.

In some embodiments, the cathode active material may be an NCM-based lithium composite oxide including nickel, cobalt and manganese.

The cathode may be recovered by separating the cathode from the lithium secondary battery. The cathode may be, for example, may be a cathode recovered from a used lithium secondary battery or a cathode damaged or failed in the manufacturing process.

For example, the cathode may include the cathode current collector (e.g., aluminum (Al)) and the cathode active material layer as described above, and the cathode active material layer may include a conductive material and a binder together with the above-described cathode active material.

The conductive material may include, for example, a carbon-based material such as graphite, carbon black, graphene, carbon nanotube or the like. The binder may include, for example, a resin material such as vinylidene fluoride-hexafluoropropylene copolymer (PVDF-co-HFP), polyvinylidene fluoride (PVDF), polyacrylonitrile, polymethyl methacrylate or the like.

In some embodiments, the cathode active material may be collected by pulverizing the recovered cathode. Accordingly, the cathode active material may be collected in a powder form. As described above, the cathode active material mixture may include lithium transition metal oxide powder, and for example, may include NCM-based lithium oxide powder (e.g., Li(NCM)O₂).

In some embodiments, the cathode active material may include cathode active material particles such as the NCM-based lithium oxide. For example, the cathode active material may be substantially composed of the cathode active material particles.

In some embodiments, the cathode active material may be subjected to heat treatment before inputting it in a reduction leaching process described below. For example, impurities such as the conductive material and the binder included in the cathode active material layer may be at least partially removed by the heat treatment. Accordingly, a high purity cathode active material (e.g., lithium transition metal oxide particles) may be input in the reduction leaching process.

The heat treatment may be performed at a temperature of about 100° C. to 500° C. In an embodiment, the heat treatment may be performed at a temperature about 350° C. to 450° C. As the impurities are substantially removed within the above range, decomposition and damage of the cathode active material may be prevented.

Separating the Metals from the Cathode Active Material

In some embodiments, a first leachate may be produced by treating the prepared cathode active material with a first acidic solution containing a reducing agent in an amount smaller than an amount corresponding to a reaction equivalent of the cathode active material (e.g., process S20).

For example, a relatively small amount of manganese may be leached into the first leachate by inputting a reducing agent in an amount smaller than the amount corresponding to the reaction equivalent of the cathode active material. Accordingly, a purity of cobalt of the first leachate in the cobalt extraction process may be increased, and an extraction rate of manganese of the second leachate, which will be described below, may be increased.

For example, the expression "reducing agent in an amount smaller than the amount corresponding to the reaction equivalent of the cathode active material" used herein may mean a reducing agent having the number of moles smaller than the number of moles corresponding to the reaction equivalent of the cathode active material or a reducing agent having a weight smaller than the weight corresponding to the reaction equivalent of the cathode active material.

For example, the "amount corresponding to the reaction equivalent of the cathode active material" may mean an amount of the reducing agent required to substantially reduce all of the cathode active materials.

For example, the reducing agent may include at least one of hydrogen peroxide ($H_2O_2$), $SO_2$, $Na_2S$, NaHS, $Na_2S_2O_5$, $NaHSO_3$, $Na_2S_2O_3$, $KHSO_3$, $K_2SO_3$, $FeSO_4$, $H_2S$, glucose, sucrose and ascorbic acid. In an embodiment, the reducing agent may be hydrogen peroxide. When using the above-described type of reducing agent, for example, reduction of a lithium transition metal oxide included in the cathode active material may be easily implemented.

The first acidic solution may be an acid solvent, and may include, for example, at least one of sulfuric acid ($H_2SO_4$), hydrochloric acid (HCl), nitric acid ($HNO_3$), oxalic acid and citric acid. In an embodiment, the first acidic solution may include sulfuric acid. When using the above-described type of acidic solution as an acid solvent, for example, the lithium transition metal oxide may be leached into a lithium precursor and a transition metal precursor.

For example, when the reducing agent is hydrogen peroxide and the first acidic solution is sulfuric acid, the above-described leaching may be performed, for example, through a reaction represented by Chemical Equation 1 below.

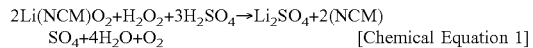

2Li(NCM)$O_2$+$H_2O_2$+3$H_2SO_4$→$Li_2SO_4$+2(NCM)$SO_4$+4$H_2O$+$O_2$      [Chemical Equation 1]

Accordingly, the reaction equivalent of the lithium transition metal oxide of the reducing agent may be 0.5 moles based on 1 mole of the lithium transition metal oxide.

Figure 2:
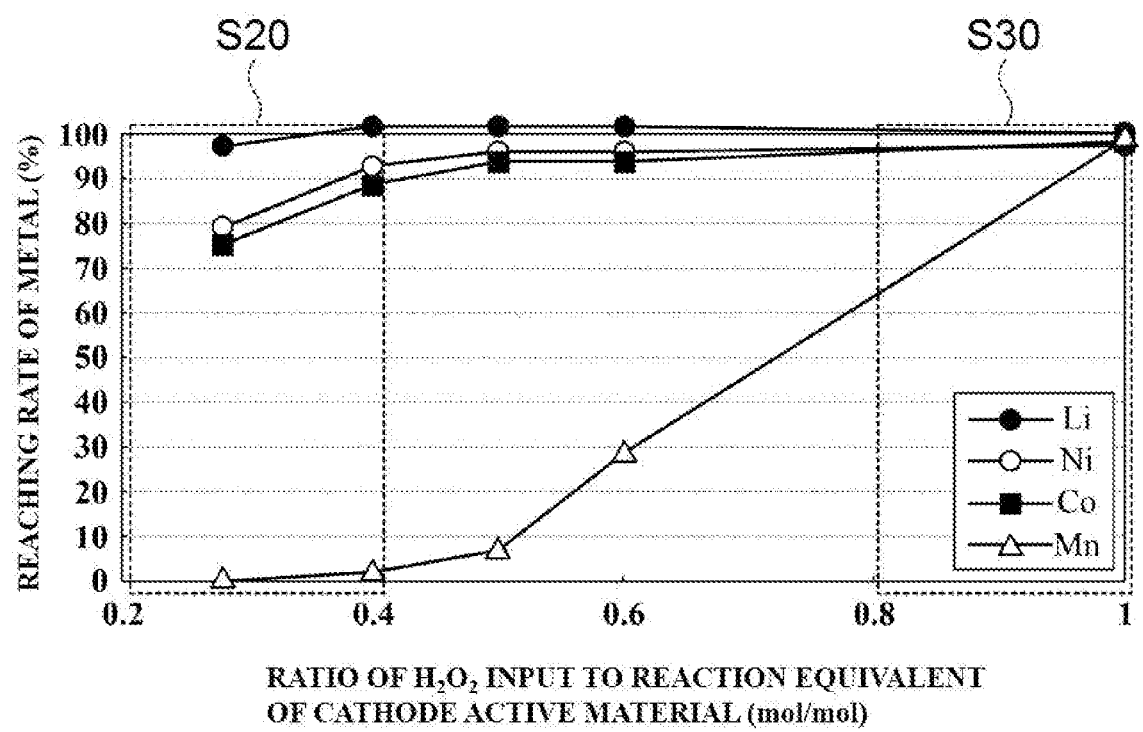
FIG. 2 is a schematic graph illustrating leaching rates of each transition metal according to a ratio of reducing agent input.

FIG. 2 is a schematic graph illustrating leaching rates of each transition metal according to the ratio of the reducing agent input. Specifically, FIG. 2 is a graph schematically illustrating the leaching rates of transition metals according to a ratio of hydrogen peroxide to the reaction equivalent of the cathode active material.

Referring to FIG. 2, a very low leaching rate of manganese and high leaching rates of nickel and cobalt may be implemented together in a section where the ratio of hydrogen peroxide to the reaction equivalent of the cathode active material is low (e.g., 0.4 or less).

In some embodiments, the amount of the reducing agent used in the process of producing the first leachate may be 0.2 to 0.4 times the amount corresponding to the reaction equivalent of the lithium transition metal oxide. In this case, as shown in FIG. 2, the leaching rate of manganese is very low and the leaching rates of nickel and cobalt are high, such that the contents of nickel and cobalt in the first leachate may be increased and the content of manganese may be significantly decreased. Accordingly, as will be described below, the first leachate may be directly input in the cobalt extraction process without going through the manganese extraction process.

As shown in FIG. 1, a second leachate may be produced by treating the remaining cathode active material except for the fraction included in the first leachate with a second acidic solution containing a reducing agent (e.g., process S30).

For example, the "remaining cathode active material" may mean a material remaining after separating the first leachate from the cathode active material. For example, the remaining cathode active material may be composed of substantially the same element as the above-described cathode active material and may have a composition different from that of the cathode active material. For example, the remaining cathode active material may have a higher content of manganese and lower contents of cobalt and nickel than that of the cathode active material.

In embodiments, the amount of the reducing agent used in the process of producing the second leachate may be input 0.8 to 1.2 times the amount corresponding to the reaction equivalent of the remaining cathode active material. In an embodiment, the amount of the reducing agent used in the process of producing the second leachate may be input 0.9 to 1.1 times the amount corresponding to the reaction equivalent of the remaining cathode active material.

For example, in the process of producing the second leachate, an amount corresponding to the reaction equivalent of the remaining cathode active material may be input. In this case, the meaning of the term "reaction equivalent" does not mean only the exact equivalent required for a reaction, but may include a value considering a process error.

For example, types of reducing agent and the second acidic solution input in the process of producing the second leachate may be substantially the same as the types of the reducing agent and the first acidic solution used in the step of producing the first leachate.

In this case, as shown in FIG. 2, the content of manganese contained in the second leachate may be increased due to the high leaching rate of manganese. For example, since large amounts of cobalt and nickel are separated into the first leachate, the second leachate may have a high content of manganese and low contents of cobalt and nickel. Accordingly, the second leachate may secure high extraction rate and extraction efficiency of manganese in the manganese extraction process.

As described above, the first leachate may have contents of nickel and cobalt higher than the content of manganese, and the second leachate may have a content of manganese higher than the contents of nickel and cobalt.

In some embodiments, the contents of cobalt and nickel included in the first leachate may be 75 weight percent (wt. %) to 100 wt. % of a total weight of the transition metals included in the first leachate, and the content of manganese included in the second leachate may be 30 wt. % to 75 wt. % of the total weight of the transition metals included in the second leachate. The metal may include manganese, cobalt, nickel and/or lithium.

In this case, the first leachate may be a cobalt and nickel rich (Co/Ni rich) solution, and the second leachate may be a manganese rich (Mn rich) solution. Accordingly, as will be described below, the first leachate may be directly input in the cobalt and nickel extraction process to extract high-purity cobalt, and the second leachate may be input in the manganese extraction process to increase the extraction rate and extraction efficiency of manganese.

In some embodiments, the reducing agent may be input in different amounts according to a content ratio of the transition metals included in the cathode active material. For example, the mol ratio of Ni:Co:Mn of NCM in the cathode active material may be any one selected from 40:30:30, 60:20:20 or 80:10:10 in For example, as the Ni content is increased, the amount of reducing agent input may be increased. Accordingly, the transition metal may be leached under optimal leaching conditions by appropriately changing the input amount of the reducing agent according to a composition ratio of the transition metals in the cathode active material.

In some embodiments, a weight ratio of the remaining cathode active material based on a weight of the cathode active material may be 25 wt. % to 50 wt. %. In this case, the weight of the solution (e.g., the second leachate) input in the manganese extraction process may be reduced. Accordingly, the extraction efficiency of manganese may be increased and the purity of the extracted manganese may be improved.

In some embodiments, a transition metal may be recovered from the above-described first leachate and second leachate (e.g., process S40).

For example, a single leachate may be prepared by treating the cathode active material with an acidic solution containing a reducing agent in an amount corresponding to the reaction equivalent of the cathode active material, and the prepared leachate may be directly input in the manganese extraction process. However, in this case, the contents of both manganese and cobalt are high in the single leachate, such that cobalt or nickel may be extracted together during extracting manganese. Accordingly, the extraction rate of manganese and the purity of cobalt may be decreased.

According to some embodiments, the method may further include the process of sequentially extracting cobalt and nickel from the first leachate.

The first leachate may be input, for example, in a cobalt extraction process (e.g., process S43), and then may be input in a nickel extraction process (e.g., process S45) after extracting cobalt. Accordingly, high-purity cobalt and nickel may be extracted from the first leachate, which is a cobalt and nickel rich solution. For example, the above-described cobalt extraction and nickel extraction may be performed continuously.

According to some embodiments, the method may further include the step of sequentially extracting manganese, cobalt and nickel from the second leachate.

The second leachate may be input, for example, in a manganese extraction process (e.g., process S41) and then may be sequentially input in a cobalt extraction process (e.g., process S43) and a nickel extraction process (e.g., process S45). Accordingly, manganese may be recovered at a high extraction rate of manganese from the second leachate, which is a manganese rich solution. For example, the above-described manganese extraction, cobalt extraction, and nickel extraction may be performed continuously.

In some embodiments, the step of extracting manganese from the first leachate may not be included in the above-described step of recovering the transition metal. The content of manganese in the first leachate may be very low or substantially absent, and the first leachate may be directly input in the cobalt extraction process to extract high-purity cobalt while increasing process efficiency.

In some embodiments, an extractant used in the manganese extraction, cobalt extraction and nickel extraction processes may include at least one of a phosphoric acid-based extractant, a phosphate-based extractant, a phosphine oxide-based extractant, and a carboxylic acid-based extractant.

For example, the extractant may include at least one of di-2-ethylhexyl phosphoric acid (D2EHPA), bis(2,4,4-trimethylpentyl) phosphinic acid (Cyanex 272), 2-ethylhexyl phosphoric acid mono-2-ethylhexyl ester (PC88A), tributyl phosphate, trioctyl phosphine oxide and alkyl monocarboxylic acid.

According to some embodiments, the above-described extractant may be diluted in an organic solvent diluent. For example, the organic solvent may include at least one of kerosene, hexane, benzene and toluene. For example, a molar ratio of the extractant in the diluent may be 0.4 to 0.7.

For example, the diluted extractant may be subjected to saponification by reacting with a basic compound (e.g., NaOH). In this case, the H group of the acidic extractant may be substituted with the Na group to prevent a decrease in pH of the solution to be extracted during extracting the transition metal.

For example, the transition metal may be extracted by mixing the saponified extractant with a solution to be extracted (e.g., the first leachate or the second leachate) so that a ratio of organic phase to aqueous phase ('organic phase/aqueous phase ratio') is 1 to 5. For example, as the content of the transition metal in the solution to be extracted is increased, the organic phase/aqueous phase ratio may be increased. Accordingly, an excellent extraction rate of transition metal may be implemented by adopting an optimal organic phase/aqueous phase ratio according to the content of the transition metal.

In some embodiments, D2EHPA may be used as an extractant in the manganese extraction process and Cyanex 272 may be used as an extractant in the cobalt extraction process. Further, D2EHPA or PC88A may be used as an extractant in the nickel extraction process.

For example, the step of recovering the transition metal described above may be performed through a continuous multi-stage extraction process. In this case, a ratio of metal to be extracted in the organic phase may be increased through the plurality of extraction processes, thereby finally improving the recovery rate of the transition metal.

Hereinafter, experimental examples including specific examples and comparative examples will be described to more concretely understand the present invention. However, those skilled in the art will appreciate that such examples are provided for illustrative purposes and do not limit subject matters to be protected as disclosed in appended claims. Therefore, it will be apparent to those skilled in the art various alterations and modifications of the embodiments are possible within the scope of the present invention.

Example 1

1 kg of cathode material separated from a used lithium secondary battery was subjected to heat treatment at 450° C. for 1 hour. The cathode material subjected to heat treatment was cut into small units and pulverized through milling to obtain a sample of Li—Ni—Co—Mn oxide cathode active material (process S10).

0.1 kg of the cathode active material sample and hydrogen peroxide of 0.4 times the amount corresponding to the reaction equivalent of the cathode active material were prepared as a 35% hydrogen peroxide solution, then the prepared solution was put into 0.6 kg of 3M sulfuric acid solvent, followed by performing a reaction for 6 hours under conditions of 80° C. and 1 atm. After the reaction, the remaining cathode active material and the solution were separated to produce a first leachate and the remaining cathode active material (process S20).

A 35% hydrogen peroxide solution was prepared using the remaining cathode active material and hydrogen peroxide of 1.0 times the amount corresponding to the reaction equivalent of the remaining cathode active material, then put into a 3M sulfuric acid solvent, followed by a reaction for 6 hours. After the reaction, the resulting solution was separated from the solution to produce a second leachate (process S30).

The produced first leachate was input in a cobalt extraction process to recover cobalt, and continuously input in a nickel extraction process to recover nickel. In addition, the second leachate was input in a manganese extraction process to recover manganese, and continuously input in the cobalt extraction process and the nickel extraction process to recover cobalt and nickel (process S40).

In the manganese extraction process, a 50% saponified 1M D2EHPA solution was used as an extractant. Specifically, a 1M D2EHPA solution was prepared by diluting D2EHPA in kerosene, and NaOH was put into the diluted 1M D2EHPA solution by the number of moles corresponding to 50% of the number of moles of D2EHPA, followed by performing a saponification process to obtain the 50% saponified 1M D2EHPA solution. Then, manganese was extracted by mixing the obtained 50% saponified 1M D2EHPA (organic phase) and the second leachate (aqueous phase) so that the organic phase/aqueous phase ratio was 4.5.

Further, in the cobalt extraction process, 40% saponified 0.8M Cyanex 272 was used as an extractant. Cobalt was extracted by mixing the 40% saponified 0.8M Cyanex 272 (organic phase) and the second leachate (aqueous phase) so that the organic phase/aqueous phase ratio was 2.0.

In addition, in the nickel extraction process, 60% saponified 1M PC88A was used as an extractant. Nickel was extracted by mixing the 60% saponified 1M PC88A (organic phase) and the second leachate (aqueous phase) so that the organic phase/aqueous phase ratio was 3.5.

Example 2

Transition metals were recovered according to the same procedures as described in Example 1, except that a reducing agent of 0.28 times the amount corresponding to the reaction equivalent of the cathode active material was input in the first leachate production process, and 50% saponified 1M D2EHPA (organic phase) and the second leachate (aqueous phase) were mixed so that the organic phase/aqueous phase ratio was 3.7.

Example 3

Transition metals were recovered according to the same procedures as described in Example 1, except that a reducing agent of 0.5 times the amount corresponding to the reaction equivalent of the cathode active material was input in the first leachate production process.

Example 4

Transition metals were recovered according to the same procedures as described in Example 1, except that a reducing agent of 0.1 times the amount corresponding to the reaction equivalent of the cathode active material was input in the first leachate production process.

Comparative Example

Transition metals were recovered according to the same procedures as described in Example 1, except that a leachate was obtained by putting the cathode active material sample and a reducing agent of 1.0 times the amount corresponding to the reaction equivalent of the cathode active material into a sulfuric acid solvent without performing a separate leaching process on the remaining cathode active material, and the obtained leachate was continuously input in the manganese extraction process, the cobalt extraction process and the nickel extraction process to recover manganese, cobalt and nickel.

Table 1 below shows hydrogen peroxide equivalent ratios, remaining cathode active material ratios (i.e., a weight percent of the remaining cathode active material based on the total weight of the cathode active material) and compositions in the first leachate preparation process of the transition metals recovered in the above-described examples and comparative examples. However, in the case of the comparative example, these values are shown based on a single leachate.

TABLE 1

| Item | Ratio of $H_2O_2$ input to reaction equivalent of cathode active material (mol/mol) | Remaining cathode active material ratio (wt. %) | Composition of first leachate (wt. %) | | | | Composition of second leachate (wt. %) | | | |
|---|---|---|---|---|---|---|---|---|---|---|
| | | | Mn | Co | Ni | Li | Mn | Co | Ni | Li |
| Example 1 | 0.4 | 36 | 0.036 | 1.54 | 4.79 | 1.08 | 4.87 | 0.82 | 1.98 | 0.11 |
| Example 2 | 0.28 | 46.7 | 0.0025 | 1.38 | 4.33 | 1.1 | 4.02 | 1.03 | 2.61 | 0.12 |
| Example 3 | 0.5 | 34.8 | 0.12 | 1.63 | 4.97 | 1.09 | 4.95 | 0.64 | 1.54 | 0.19 |
| Example 4 | 0.1 | 53.6 | 0 | 1.08 | 3.48 | 1.01 | 3.26 | 1.31 | 3.36 | 0.11 |
| Comparative Example | 1.0 | 8.9 | 1.54 | 1.64 | 4.84 | 1.02 | — | — | — | — |

Referring to Table 1, in Examples 1 to 3, the amount of hydrogen peroxide input in the first leachate production step is less than 0.5 times the amount corresponding to the reaction equivalent of the cathode active material, such that the number of moles of hydrogen peroxide input in the first leachate preparation step is less than 50% of the total number of moles input. At this time, since the remaining hydrogen peroxide is input in the second leachate production process, the number of moles of hydrogen peroxide input in the first leachate production step is less than or equal to the number of moles of hydrogen peroxide input in the second leachate production process.

In this case, only a small amount of manganese was leached into the first leachate and most of the manganese was leached into the second leachate.

However, in Example 3 in which the amount of hydrogen peroxide input in the first leachate production step exceeds 0.4 times the amount corresponding to the reaction equivalent of the cathode active material, a relatively large amount of manganese was leached into the first leachate compared to Examples 1 and 2.

Further, in Example 4 in which the amount of hydrogen peroxide input in the first leachate production step was less than 0.2 times the amount corresponding to the reaction equivalent of the cathode active material, a relatively large amount of cobalt and nickel was leached into the second leachate compared to Examples 1 and 2.

Experimental Example (1) Measurement of Extraction Rate of Each Transition Metal from the Second Leachate Weights of manganese, cobalt, nickel and lithium in the second leachate and weights of manganese, cobalt, nickel and lithium extracted from the second leachate were measured, and a weight of the extracted manganese based on the weights of the transition metals of the cathode active material was calculated as % by weight for each metal.

However, in the case of the comparative example, the extraction rate of each transition metal was measured from the single leachate.

(2) Purity of Cobalt Extracted from the First Leachate

In the above-described examples and comparative examples, the purity of cobalt was calculated by measuring the weight ratio of cobalt among the transition metals extracted in the organic phase through inductively coupled plasma optical emission spectrometer (ICP-OES).

Measurement results are shown in Table 2 below.

TABLE 2

| Item | Ratio of $H_2O_2$ input to reaction equivalent of cathode active material (mol/mol) | Extraction rate of transition metal from second leachate (wt. %) | | | | Purity of Co extracted from the first leachate |
|---|---|---|---|---|---|---|
| | | Mn | Co | Ni | Li | |
| Example 1 | 0.4 | 88.2 | 18.3 | 0 | 0 | 97.7 |
| Example 2 | 0.28 | 86.6 | 14.1 | 0 | 0 | 99.8 |
| Example 3 | 0.5 | 96.0 | 22.9 | 0 | 0 | 92.7 |
| Example 4 | 0.1 | 78.7 | 10.1 | 0 | 0 | 100 |
| Comparative Example | 1.0 | 72.2 | 6.1 | 5.7 | 2.0 | 51.7 |

Referring to Table 2, in the examples in which the reducing agent in an amount smaller than the amount corresponding to the reaction equivalent of the cathode active material was input in the first leachate production step, a relatively high extraction rate of manganese and high purity of cobalt were secured compared to the comparative example in which the single leachate was prepared by putting a reducing agent in an amount corresponding to the reaction equivalent from the beginning.

However, in Example 3 in which the amount of hydrogen peroxide input in the first leachate production step exceeds 0.4 times the amount corresponding to the reaction equivalent of the cathode active material, a relatively large amount of manganese was leached into the first leachate compared to Examples 1 and 2, and thereby a relatively large amount of cobalt was leached into the second leachate. Therefore, the purity of cobalt in the second leachate was relatively decreased compared to Examples 1 and 2.

Further, in Example 4 in which the amount of hydrogen peroxide input in the first leachate production step was less than 0.2 times the amount corresponding to the reaction equivalent of the cathode active material, a relatively small amount of cobalt and nickel was leached from the first leachate compared to Examples 1 and 2, such that the contents of cobalt and nickel in the second leachate were increased, and thereby the extraction rate of manganese was decreased compared to Examples 1 and 2.

In the comparative example in which all reducing agents in an amount corresponding to the reaction equivalent of the cathode active material were directly put into the cathode active material sample in the first leachate production step without going through a separate step of leaching the remaining cathode active material, the extraction rate of manganese and purity of cobalt were considerably reduced compared to the examples.

The invention claimed is:

1. A method for reducing waste by recovering a transition metal of a lithium secondary battery, comprising:
   preparing a cathode active material from a cathode of a lithium secondary battery, wherein the cathode active material comprises a lithium transition metal oxide containing nickel, cobalt and manganese as transition metals;
   producing a first leachate by treating the cathode active material with a first acidic solution containing a first reducing agent in an amount less than an amount corresponding to a reaction equivalent of the cathode active material, wherein a content (wt %) of nickel or cobalt in the first leachate is greater than a content (wt %) of manganese in the first leachate; and
   producing a second leachate by treating a remaining cathode active material, which excludes a fraction included in the first leachate, with a second acidic solution containing a second reducing agent, wherein a content (wt %) of manganese in the second leachate is greater than a content (wt %) of nickel or cobalt in the second leachate.

2. The method for reducing waste according to claim 1, wherein an amount of the first reducing agent used in producing the first leachate is 0.2 to 0.4 times the amount of the first reducing agent corresponding to the reaction equivalent of the cathode active material,
   wherein the amount of the first reducing agent corresponding to the reaction equivalent of the cathode active material is an amount of the first reducing agent required to reduce all of the transition metals included in the cathode active material.

3. The method for reducing waste according to claim 2, wherein the reaction equivalent of the cathode active material of the first reducing agent is 0.5 mol based on 1 mol of the lithium transition metal oxide.

4. The method for reducing waste according to claim 3, wherein the first reducing agent or the second reducing agent is hydrogen peroxide.

5. The method for reducing waste according to claim 2, wherein an amount of the second reducing agent used in producing the second leachate is 0.8 to 1.2 times the amount of the second reducing agent corresponding to the reaction equivalent of the remaining cathode active material,
wherein the amount of the second reducing agent corresponding to the reaction equivalent of the remaining cathode active material is an amount of the first reducing agent required to reduce all of the transition metals included in the remaining cathode active material.

6. The method for reducing waste according to claim 1, wherein contents of cobalt and nickel contained in the first leachate are 75% to 100% by weight of a total weight of the transition metals, and
a content of manganese contained in the second leachate is 30% to 75% by weight of the total weight of the transition metals.

7. The method for reducing waste according to claim 6, further comprising sequentially extracting cobalt and nickel from the first leachate.

8. The method for reducing waste according to claim 6, further comprising sequentially extracting manganese, cobalt and nickel from the second leachate.

9. The method for reducing waste according to claim 1, wherein a weight ratio of the remaining cathode active material based on a weight of the cathode active material is 25% to 50% by weight.

10. The method for reducing waste according to claim 1, wherein the first acidic solution and the second acidic solution include sulfuric acid.

* * * * *